(12) United States Patent
Gorokhov et al.

(10) Patent No.: US 8,374,200 B2
(45) Date of Patent: Feb. 12, 2013

(54) METHODS AND SYSTEMS FOR PROCESSING OVERHEAD REDUCTION FOR CONTROL CHANNEL PACKETS

(75) Inventors: Alexei Gorokhov, San Diego, CA (US); Aamod Khandekar, San Diego, CA (US); Mohammad J. Borran, San Diego, CA (US); Rajat Prakash, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1153 days.

(21) Appl. No.: 11/768,135

(22) Filed: Jun. 25, 2007

(65) Prior Publication Data

US 2007/0297379 A1 Dec. 27, 2007
US 2011/0255522 A9 Oct. 20, 2011

Related U.S. Application Data

(63) Continuation-in-part of application No. 11/766,353, filed on Jun. 21, 2007, and a continuation-in-part of application No. 11/766,325, filed on Jun. 21, 2007.

(60) Provisional application No. 60/816,281, filed on Jun. 23, 2006, provisional application No. 60/815,733, filed on Jun. 21, 2006, provisional application No. 60/815,664, filed on Jun. 21, 2006.

(51) Int. Cl.
*H04J 3/24* (2006.01)

(52) U.S. Cl. ........ 370/474; 370/389; 370/471; 370/473; 370/476; 370/338; 714/746; 714/48; 714/774; 714/776; 714/751

(58) Field of Classification Search .................. 370/232, 370/280, 328–329, 335–336, 338, 341–342, 370/349, 310.1, 345, 347, 270–274, 230, 370/389, 392, 474, 216, 473, 476, 471; 455/442, 455/452.2, 522, 450, 509, 464; 380/247–250; 714/48, 746, 749, 751, 776, 774
See application file for complete search history.

(56) References Cited

U.S. PATENT DOCUMENTS

| | | | |
|---|---|---|---|
| 6,377,809 | B1 | 4/2002 | Rezaiifar et al. |
| 6,606,485 | B1 | 8/2003 | Chen et al. |
| 6,928,066 | B1 * | 8/2005 | Moon et al. ................ 370/342 |
| 7,016,319 | B2 | 3/2006 | Baum et al. |
| 7,042,957 | B1 | 5/2006 | Zirwas |
| 7,120,166 | B2 | 10/2006 | McFarland et al. |

(Continued)

FOREIGN PATENT DOCUMENTS

| | | |
|---|---|---|
| EP | 1359774 | 11/2003 |
| JP | 2005102210 A | 4/2005 |

(Continued)

OTHER PUBLICATIONS

Bellec M et al: A PHY/MAC Proposal for IEEE 802.22 WRAN Systems—Part 1: The PHY, doc.: IEEE 802.22-06/0004r0 Internet Citation, [online] Jan. 11, 2006, XP007902868, pp. 1-34.

(Continued)

*Primary Examiner* — Meless N Zewdu
*Assistant Examiner* — Babar Sarwar
(74) *Attorney, Agent, or Firm* — Peng Zhu

(57) ABSTRACT

Various methods and systems receiving information from an access point over a wireless link in order to reduce processing and/or transmission overhead are disclosed. Such methods and systems may include the processing of a received packet using a descrambling operation on at least a portion of the packet's information based on a MAC-ID associated with an access terminal to produce at least a first processed packet, and determining whether the received packet is targeted to the access terminal based on the first processed packet.

54 Claims, 7 Drawing Sheets

U.S. PATENT DOCUMENTS

| | | | |
|---|---|---|---|
| 2002/0015405 A1* | 2/2002 | Sepponen et al. | 370/389 |
| 2002/0126641 A1 | 9/2002 | Bender | |
| 2002/0138721 A1* | 9/2002 | Kwon et al. | 713/151 |
| 2002/0170013 A1* | 11/2002 | Bolourchi et al. | 714/758 |
| 2004/0058687 A1 | 3/2004 | Kim et al. | |
| 2005/0094615 A1 | 5/2005 | Kim et al. | |
| 2005/0195758 A1 | 9/2005 | Chitrapu | |
| 2005/0286482 A1 | 12/2005 | Rajkotia | |
| 2006/0002451 A1 | 1/2006 | Fukuta et al. | |
| 2006/0018258 A1 | 1/2006 | Teague et al. | |
| 2006/0024541 A1 | 2/2006 | Weiss et al. | |
| 2006/0025079 A1 | 2/2006 | Sutskover et al. | |
| 2006/0188003 A1 | 8/2006 | Larsson | |
| 2006/0221810 A1 | 10/2006 | Vrcelj et al. | |
| 2006/0256708 A1 | 11/2006 | Wang et al. | |
| 2007/0047495 A1 | 3/2007 | Ji | |
| 2007/0201398 A1 | 8/2007 | Yang et al. | |
| 2007/0202816 A1 | 8/2007 | Zheng | |
| 2008/0043879 A1 | 2/2008 | Gorokhov et al. | |
| 2008/0056183 A1 | 3/2008 | Gorokhov et al. | |
| 2011/0019770 A1 | 1/2011 | Gorokhov et al. | |
| 2011/0255522 A9 | 10/2011 | Gorokhov et al. | |

FOREIGN PATENT DOCUMENTS

| | | |
|---|---|---|
| KR | 20020034651 | 5/2002 |
| KR | 20020034818 | 9/2002 |
| RU | 2154901 | 8/2000 |
| RU | 2185031 | 7/2002 |
| RU | 2207723 C1 | 6/2003 |
| RU | 2238611 C1 | 10/2004 |
| WO | 2005104589 | 11/2005 |
| WO | WO2005104689 A2 | 11/2005 |

OTHER PUBLICATIONS

Chellali A et al., "Computational reduction during idle transmission in DSL modems", Acoustics, Speech, and Signal Processing 1998. Proceedings 1998 IEEE Internationla Conference on Seattle, WA, May 12-15, 1998, vol. 6, pp. 3441-3444.

Choi S.H. et al., "Method and apparatus for confirming multiple frame structure and indicating transmission diversity through phase modulation of forward pilot time slot in nb-tdd dmna communication system", Database WPI, May 9, 2002. pp. 1-3.

Jondral FK et al.: "Spectrum pooling: an innovative strategy for the enhancement of spectrum efficiency" IEEE Communications Magazine, IEEE Serivce Center, Piscataway, US, vol. 42, No. 3, Mar. 2004, pp. S8-S14.

Khalona R. (Nextwave Broadband): "Next Broadband WRAN proposal outline" doc.: IEEE 802.22-05/0091r0, [online] Nov. 7, 2005, XP002456664, pp. 1-19.

Poston J D et al.: "Discontiguous OFDM considerations for dynamic spectrum access in idle TV channels" New Frontiers in Dynamic Spectrum Access Networks, 2005, Dyspan 20056. 2005 First IEEE International Symposium on Baltimore, MD, USA Nov. 8-11, 2005, pp. 607-610.

Tomcik, Jim,"MBFDD and MSTDD Wideband Mode: Technology Overview", IEEE 802.20 Working Group on Mobiie Broadband Wireless Access, IEEE c802.20-05/68r1, Jan. 6, 2006, pp. 1-109.

Tomcik, Jim, "QFDD Technology Overview Presentation", IEEE Working Group on Mobile Broadband Wireless Access, IEEE c802.20-05-59r1, Nov. 15, 2005, Slides 1-73.

Written Opinion—PCT/US07/072049, International Search Authority, European Patent Office—Nov. 13, 2007.

International Search Report—PCT/US07/072049, International Search Authority—European Patent Office—Nov. 13, 2007.

Taiwan Search Report—TW096122793—TIPO—Sep. 21, 2011.

Schaefer, D.J."Wide area adaptive spectrum applications", Military Communications Conference ,2001. MILCOM 2001. Communications for Network-Centric Operations: Creating the Information Force.IEEE, Oct. 31, 2001.

Tomcik, T.: "QTDD Performance Report 2," IEEE C802.20-05/88, IEEE 802.20 Working Group on Mobile Broadband Wireless Access, <http://ieee802.org/20/>, pp. 1-56, XP002386798 (Nov. 15, 2005).

ETSI 3GPP TS 25.222 "3rd Generation Partnership Project; Technical Specification Group Radio Access Network; Multiplexing and channel coding (TDD)," Release 7, Mar. 2006.

Taiwan Search Report—TW096122420—TIPO—May 17, 2012.

Ericsson: "Discussion on HS- SCCH misdetection performance and provision of a UE-Id on HS- DSCH" 3GPP Draft; R2-030337, 3rd Generation Partnership Project (3GPP), Mobile Competence Centre; 650, Route Des Lucioles; F-06921 Sophia- Antipolis Cedex; France, vol. RAN WG2, No. Sophia Antipolis, France; 20030214, Feb. 14, 2003, XP050122984 [retrieved on Feb. 14, 2003]. p. 1-9.

Ericsson: "Discussion on HS- SCCH misdetection probability" 3GPP Draft; R1-030351, 3rd Generation Partnership Project (3GPP), Mobile Competence Centre; 650, Route Deslucioles ; F-06921 Sophia-Antipolis Ceoex ; France, vol. RAN WG1, No. Tokyo; 20030221, Feb. 21, 2003, XP050097449 [retrieved on Feb. 21, 2003]. p. 1-9.

Lucent Technologies: "Comparison of schemes for UE Specific CRC" 3GPP Draft; R1-02-0076 UESPCRC, 3rd Generation Partnership Project (3GPP), Mobile Competence Centre ; 650, Route Des Lucioles ; F-06921 Sophia-Antipolis Cedex; France, vol. RAN WG1, No. Espoo, Finland; 200201 12, Jan. 12, 2002, XP050095659 [retrieved on Jan. 21, 2002].

Rapporteur: "TR 25.858 v 0.1.2" 3GPP Draft; R1-01-1343-REV1, 3rd Generation Partnership Project (3GPP), Mobile Competence Centre ; 650, Route Des Lucioles ; F-06921 Sophia-Antipolis Cedex; France, vol. RAN WG1, No. Espoo, Finland; 200201 06, Jan. 6, 2002, XP050095584. p. 1-23.

Russian Explanatory Dictionary of Radio Electronics (P.K. Gorokhov, Moscow, 1993, p. 93).

Siemens: "Improved UE Specific CRC Generation" Apr. 15, 2002, 3GPP Draft; R1-02-0493 (UE Specific CRC Generation), 3rd Generation Partnership Project (3GPP), Mobile Competence Centre; 650, Route Des Lucioles; F-06921 Sophia- Antipolis Cedex; France, XP050096088 [retrieved on Apr. 15, 2002]. p. 1-7.

* cited by examiner

METHODS AND SYSTEMS FOR PROCESSING OVERHEAD REDUCTION FOR CONTROL CHANNEL PACKETS

CLAIM OF PRIORITY UNDER 35 U.S.C. §119 AND §120

The present application for patent claims priority to Provisional Application No. 60/816,281, entitled "ULTRA-HIGH DATA RATE (UHDR) FOR MOBILE BROADBAND WIRELESS ASSESS," filed Jun. 23, 2006, assigned to the assignee hereof and hereby expressly incorporated by reference herein; and is a continuation-in-part of application Ser. No. 11/766,353, entitled "METHODS AND APPARATUS FOR MEASURING, COMMUNICATING AND/OR USING INTERFERENCE INFORMATION," filed Jun. 21, 2007, which claims priority to Provisional Application No. 60/815,733, entitled "SUPERFRAME STRUCTURE FOR WIRELESS COMMUNICATION SYSTEM," filed Jun. 21, 2006; and is a continuation-in-part of application Ser. No. 11/766,325, entitled "WIRELESS RESOURCE ALLOCATION METHODS AND APPARATUS," filed Jun. 21, 2007, which claims priority to Provisional Application No. 60/815,664, entitled "BANDWIDTH ALLOCATION FOR WIRELESS COMMUNICATION SYSTEM," filed Jun. 21, 2006, all assigned to the assignee hereof.

BACKGROUND

I. Field

The following description relates generally to wireless networks, and more particularly to the reduction of processing overhead in a wireless network environment.

II. Background

Wireless communication networks are commonly used to communicate information regardless of where a user is located and whether a user is stationary or moving. Generally, wireless communication networks are established through a mobile device (or "access terminal") communicating with a series of base stations (or "access points"). When multiple access terminals are being serviced by a single access point, the access point may be used to allocate and de-allocate resources, e.g., specific frequency components in an Orthogonal Frequency Divisional Multiplexed (OFDM) system, as well as control the power output and other aspects of each access terminal.

Typically, the allocation of resources and control of individual access terminals can be handled through a common "control channel" broadcasted by an access point to the access terminals. That is, as an access point broadcasts individual packets of control information, each access terminal responsive to the access point can receive the packets, extract the control information from the packets, and act upon the control information should the control information require some reconfiguration of the respective access terminal's operation.

Unfortunately, this approach to controlling individual access terminals can come at the price of wasted computing overhead.

Accordingly, methods and systems for reducing the computational overhead associated with wireless control channels may be useful.

SUMMARY

Various aspects and embodiments of the invention are described in further detail below.

In an embodiment, a method for receiving information from an access point over a wireless link includes wirelessly receiving a packet containing information, processing the received packet using at least a descrambling operation on at least a portion of the information based on a first identifier associated with an access terminal to produce at least a first processed packet, and determining whether the received packet is targeted to the access terminal based on the first processed packet.

In another embodiment, a computer-readable memory is disclosed. The computer-readable memory contains a plurality of instructions that, when accessed by a computer, enables the computer to perform the steps of processing a received packet using at least a descrambling operation on at least a portion of the information based on a first identifier associated with an access terminal to produce at least a first processed packet, and determining whether the received packet is targeted to the user based on the first processed packet.

In yet another embodiment, a system for receiving information from an access point over a wireless link includes a media access controller (MAC) with a processing circuit and a memory in communication with the processing circuit. The MAC is configured to process a wirelessly received packet to determine whether the wirelessly received packet is directed for use by the system by performing a descrambling operation on at least a portion of the received packet using a MAC identification (MAC-ID) associated with the MAC as a descrambling key.

In still another embodiment, a system for receiving information from an access point over a wireless link includes a computer-readable memory, and a determining means in communication with the memory for determining whether a packet residing in the memory is intended for use with the system based on a descrambling operation on at least a portion of the packet using a specific Media Access Controller Identifier (MAC-ID).

In a further embodiment, a method for transmitting information to an access terminal over a wireless link includes processing a first packet containing information by applying at least a scrambling operation on at least a portion of the information using a logical address associated with an intended access terminal to produce at least a first processed packet, and wirelessly transmitting the processed packet to a plurality of access terminals.

In yet another embodiment, a system for transmitting information to an access terminal over a wireless link includes a media access control (MAC) circuit configured to scramble at least a portion of information in a packet using a specific Media Access Controller Identifier (MAC-ID), and transmission circuitry for wirelessly transmitting the scrambled packet.

BRIEF DESCRIPTION OF THE DRAWINGS

The features and nature of the present disclosure will become more apparent from the detailed description set forth below when taken in conjunction with the accompanying drawings in which reference characters identify corresponding items.

DETAILED DESCRIPTION

The disclosed methods and systems below may be described generally, as well as in terms of specific examples and/or specific embodiments. For instances where references are made to detailed examples and/or embodiments, it should be appreciated that any of the underlying principals described are not to be limited to a single embodiment, but may be expanded for use with any of the other methods and systems described herein as will be understood by one of ordinary skill in the art unless otherwise stated specifically.

It is to be appreciated that the methods and systems disclosed below may relate to both mobile and non-mobile systems including mobile phones, PDAs and lap-top PCs, as well as any number of specially equipped/modified music players (e.g., a modified Apple iPOD®), video players, multimedia players, televisions (both stationary, portable and/or installed in a vehicle), electronic game systems, digital cameras and video camcorders that might implement wireless communication technology.

It is also to be appreciated that, for the present disclosure, the term "data scrambler" may be expanded beyond its various traditional forms of use. That is, while some or all of the various disclosed embodiments of data scramblers may act such that they convert digital signals into pseudo-random sequences that avoid long strings of simple patterns, or effectively encrypt information, the term "data scrambler" may in various embodiments include any number of devices capable of encrypting, mapping or transforming a first string of digital signals into a second string of digital signals in a manner that allows some or all of the first string of digital signals to be reliably reconstructed. For example, a device that inverts every other data bit in a packet's payload or the data bits of a checksum may be considered a data scrambler in the general sense. Similarly, a device that inverts data bits of a 16-bit checksum based on a unique identifier of 16 bits or less (e.g., performs an XOR operation) may be considered a data scrambler having the unique identifier as a cipher key.

Note that in the various embodiments described below, the term "Media Access Controller Identifier" (or "MAC-ID") may be construed as an Identifier associated with a specific terminal, an identifier associated with a specific MAC belonging to a terminal or group of terminals, or both.

Figure 1:
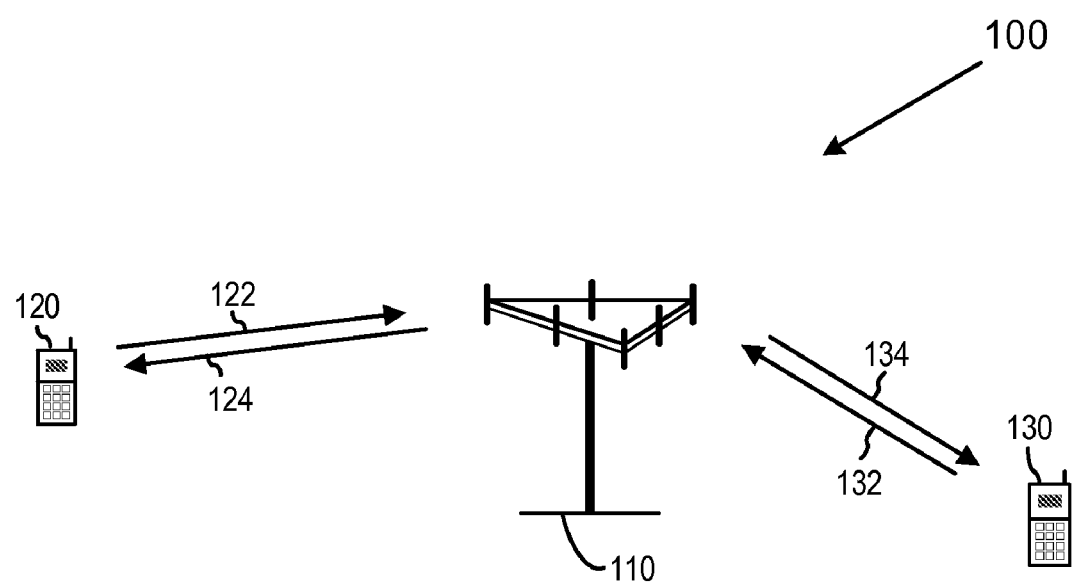
FIG. 1 depicts an exemplary wireless communication system having an access point and a number of access terminals.

FIG. 1 depicts an exemplary wireless communication system 100 having an access point 110 and a number of access terminals 120 and 130.

In operation, access terminal 120 may be in communication with access point 110 using a number of related forward link channels 124 and a number of related reverse link channels 122. Similarly, access terminal 130 may be in communication with access point 110 using a number of related forward link channels 134 and a number of related reverse link channels 132.

Generally, the access point 110 may provide at least two types of information to each of the access terminals 120 and 130 including: (1) traffic information and (2) control information. As is well known to those skilled in the relevant arts, traffic information generally consists of voice data, text message data, some form of multimedia or the like. In contrast, control information generally consists of commands and data provided by an access point for the purpose of distributing/allocating the available communication resources among access terminals, controlling the transmit power output of each access terminal, and so on. By way of example, control information might include a command from access point 110 to access terminal 120 requesting that access terminal 120 transmit traffic information using a first range of OFDM sub-carriers, a particular TDMA time slot, and using a specific output power level.

In various embodiments, some or all of the control information may be conveyed from the access point 110 to the access terminals 120 and 130 in special "control packets" transmitted via one or more predetermined wireless "control channels."

In certain embodiments, a control packet may include a header section and a payload section with the header section containing header data and the payload section containing payload data and some form of error detection data, such as a checksum. See, FIG. 5 (top-left) for an example of a control packet.

In order to identify specific control packets as being directed to a specific access terminal(s), a control packet may have a MAC-ID value of the targeted access terminal(s) (or some other identifier associated with the targeted access terminal(s)) embedded in the control packets payload or header section. For example, the access point 110 of FIG. 1 may issue a command requesting that access terminal 120 employ a specific set of sub-carriers of an available OFDM frequency range for reverse-link communications. As the appropriate control packet is formed, the MAC-ID of access terminal 120 can be imbedded therein, and the control packet can be then transmitted from the access point 110 to both access terminals 120 and 130. While both access terminals 120 and 130 may receive and perform some preliminary processing on the control packet to determine whether the control command is directed to them, only access terminal 120 may be required to perform some form of reconfiguration based on the embedded MAC-ID.

Unfortunately, this approach may be wasteful of the processing power of each access terminal 120 and 130, as well as the available transmission bandwidth of the communication system 100 as a whole.

Accordingly, in a series of embodiments much of the processing overhead and "transmission overhead", e.g., the number of bits in each control packet, may be eliminated by removing a MAC-ID from the body of a packet and then encoding the MAC-ID into the remainder of the packet by use of some form of scrambling. That is, the "weeding out" of unrelated control packets may be accomplished by scrambling portions of control packets based on a MAC-ID (or some other identifier) such that the scrambled control packets will appear as containing corrupted data by (after a de-scrambling operation) making the checksum appear wrong to those MACs not associated with the MAC-ID.

As some measure of error detection is done for each received packet at the MAC layer, control packets directed to another access terminal may be marked as corrupt and discarded by access terminals with little, if any, added overhead at the MAC layer.

Thus, not only can processing above the MAC layer be reduced, but there can be a substantial reduction in transmission overhead.

Note that in various embodiments, a particular access point may scramble control packets using a variety of cipher keys, including a MAC-ID associated with a respective access terminal, an IP address associated with an access terminal, a special key code made for the purpose of scrambling, a broadcast ID code used for broadcasting control messages to all access terminals in contact with the access point, or some hybrid ID used for allowing subsets of access terminals to be targeted. Thus, while the following discussion focuses on the use of MAC-IDs as cipher/scrambling keys, it should be appreciated that MAC-IDs are used for illustration purposes and are not intended to limit the scope of applicable substitutes.

Figure 2:
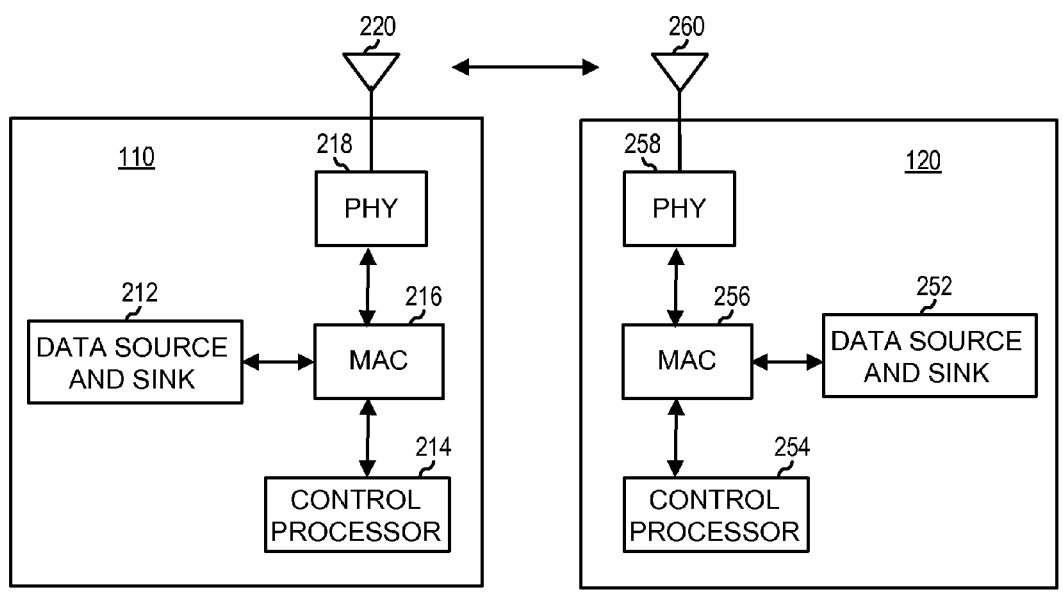
FIG. 2 depicts functional details of portions of an exemplary access point interacting with an exemplary access terminal.

FIG. 2 depicts functional details of portions of an exemplary (very simplified) access point 110 interacting with an exemplary (very simplified) access terminal 120.

As shown in FIG. 2, the exemplary access point 110 includes an antenna 220, a physical layer (PHY) device 218, a MAC device 216, a control processor 214 and a data source/sink 212. As further shown in FIG. 2, the exemplary access terminal 120 also includes an antenna 260, a physical layer (PHY) device 258, a MAC device 256, a control processor 254 and a data source/sink 252.

In operation, the physical networking infrastructure between access point 110 access terminal 120 may be established via the respective PHY devices 218 and 258 and antennas 220 and 260. Accordingly, those functions typically associated with the PHY layer, such as carrier sensing, modulation, demodulation, frequency shifting, carrier transmission and reception, and so on, can be performed.

The MACs 216 and 256, in turn, can perform a number of traditional MAC functions, such as providing a MAC-ID, forming packets, extracting data from packets, providing outer-coding and decoding, providing checksums (or other error detecting information), and so on.

The respective data sources/sinks 212 and 252 may provide traffic information, e.g., voice data, to their respective devices 110 and 120 as well as provide a useful outlet, e.g., a speaker, for wirelessly received data. Note that for the present example of FIG. 2, various communication layers/devices, such as a transport or applications layer/device, that might typically be associated with the MACs 216 and 256 are omitted for simplicity of explanation.

Continuing, the access point's control processor 214 may be used to coordinate system resources, e.g., allocate OFDM sub-carriers for a plurality of access terminals, regulate the transmit power levels of individual access terminals, and so on. For the present example, control processor 214 can provide control information directly to MAC 216, which in turn may package the control information, then forward the packaged control information to PHY 218 such that the packaged control information may be sent to access terminal 120.

The control processor 254 for access terminal 120 may receive the packaged control information via PHY 258 and MAC 256, then process the control information as may be required so as to cause access terminal 120 to operate according to the constraints dictated by the control processor 214 for access point 110.

Figure 3:
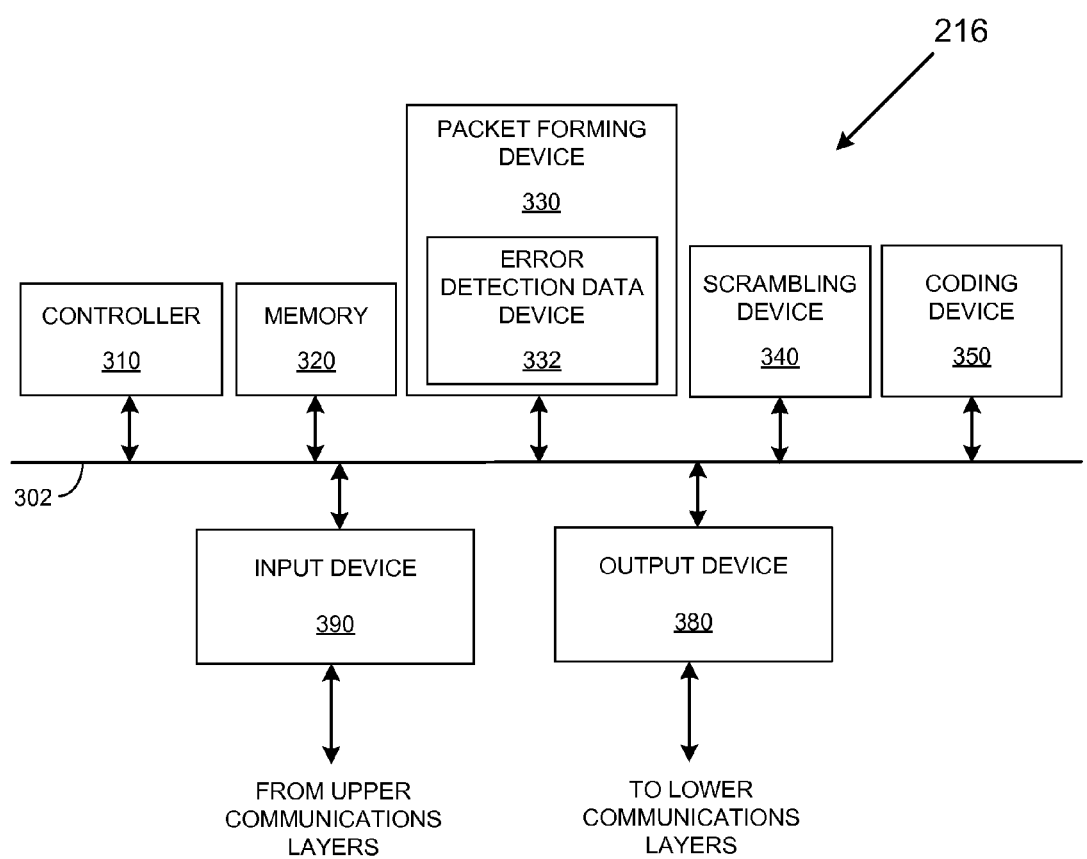
FIG. 3 shows details of a portion of an exemplary media access controller for the access point of FIG. 2.

FIG. 3 shows details of a portion of an exemplary media access controller 216 for the access point 110 of FIG. 2. As shown in FIG. 3, the exemplary media access controller 216 includes a controller 310, a memory 320, a packet forming device 330 with an error detection data device 332 (e.g., a checksum generator), a scrambling device 340, a coding device 350, an output device 380 and an input device 390. The above components 310-390 are coupled together by control/data bus 302.

Although the media access controller 216 of FIG. 3 uses a bussed architecture, it should be appreciated that any other architecture may be used as is well known to those of ordinary skill in the art. For example, in various embodiments, the various components 310-390 can take the form of separate electronic components coupled together via a series of separate busses.

Still further, in various embodiments some of the above-listed components 330-350 can take the form of software/firmware routines residing in memory 320 to be operated upon by the controller 310, or even software/firmware routines residing in separate memories while being operated upon by different controllers.

In operation, various forms of traffic information and control information may be received by the input device 390 and stored in memory 320. For instances where control information is received, the controller 310 may cause the packet forming device 330 to embed the control information into a packet. For example, the controller 310 may cause the packet forming device 330 to embed a first set of control information into a payload section of a packet, then add the appropriate packet header and provide a checksum for the payload data.

Note that while a checksum is used for error detection in the exemplary MAC embodiment of FIG. 3, in various embodiments it should be appreciated that a wide variety of alternate forms of error detection data may be used, such as Reed-Solomon codes, as may be found necessary or otherwise desirable. Thus, while the following discussion focuses on the use of checksums as cipher/scrambling keys, it should be appreciated that checksums are used for illustration purposes and are not intended to limit the scope of applicable substitutes.

Once a packet of control information is formed, the scrambling device 340 may apply any number of scrambling operations upon the packet. For example, in various embodiments, the scrambling device 340 may employ a scrambling operation based on a specially-configured shift register to convert the payload data into pseudo-random sequences that avoid long strings of simple patterns and/or encrypt the payload data. In such instances, scrambling may be based on a cipher key, e.g., a MAC-ID, related to a targeted access terminal.

For instance, assuming that a single access terminal (out of one-hundred of such devices in communication with the MAC 216) needs to be targeted, the scrambling device 340 may employ the appropriate MAC-ID of the targeted access terminal to produce a scrambled payload section that is effectively customized for the targeted access terminal. Once the scrambled control packet is received by each access terminal, each access terminal can perform a descrambling operation based upon its own MAC-ID at the MAC layer. As only the targeted access terminal will correctly descramble/reconstruct the payload section, the remaining (untargeted) access terminanls can discard the control packet as it is likely that a checksum operation performed on the wrongly reconstructed payload section will indicate a corrupted packet.

Figure 5:
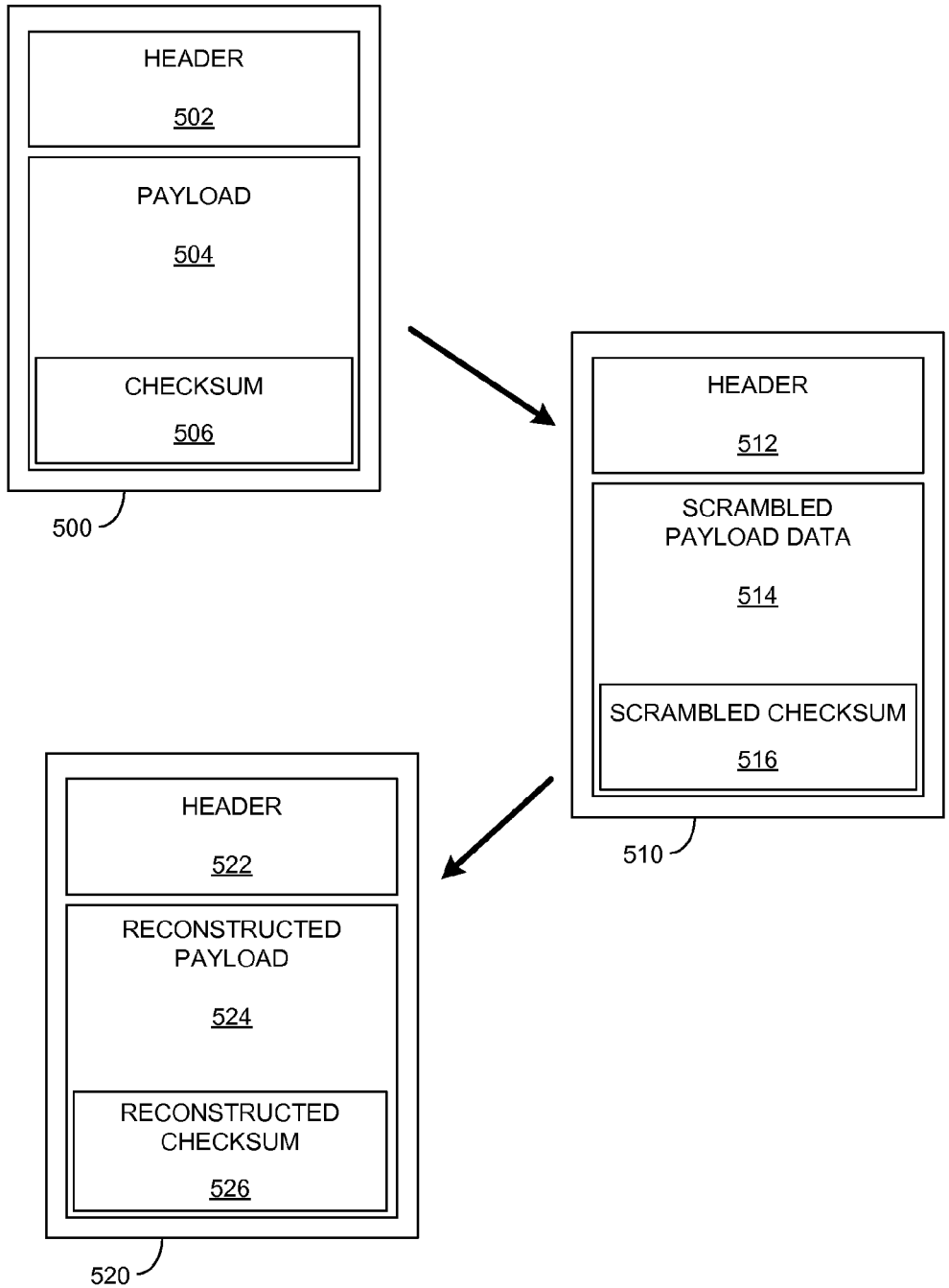
FIG. 5 depicts a number of exemplary transformations of a communication packet according to the disclosed methods and systems.

Jumping forward to FIG. 5, the process of scrambling and descrambling a control packet is illustrated. At the top-left of FIG. 5 is an exemplary control packet 500 containing a header section 502 and a payload section 504 with checksum 506. Continuing to the middle-right, a processed control packet 510 is illustrated containing a header section 512 (identical to header section 502) and a scrambled payload section 514 with scrambled checksum 516. Continuing further to the bottom-left, a reconstructed control packet 520 is illustrated containing a header section 522 (again identical to header section 502) and a reconstructed payload section 524 with reconstructed checksum 526. Note again that the reconstructed payload section 524 and checksum 506 should be the same as original payload section 504 and checksum 526 only if the same MAC-ID is used for both scrambling and descrambling.

Returning to FIG. 3, as the resultant bit-stream of scrambled payload data can be different for each unique MAC-ID employed, it should be appreciated that the scrambling device 340 can provide a unique scrambled pattern for each targeted access terminal. Also note that when control information may need to be broadcast to all access terminals in communication with the MAC 216, the scrambling device 340 may employ a broadcast ID or perhaps forego scrambling altogether.

It should also be appreciated that various embodiments of the MAC 216 of FIG. 3 may employ scrambling techniques that require less than the entirety of a packet's payload section may be scrambled. For example, in a first series of embodiments, the majority or entirety of a payload may be scrambled while in a second series of embodiments, the minority of a payload or even a single word may be scrambled. Still further, it may be useful to only scramble the checksum, which is typically a single 8 or 16-bit word.

It should further be appreciated that scrambling may take other forms beyond the application of shift-register devices with feedback, for example, the application of a simple linear or logical operation on one or more words within a packet. For example, by allowing the scrambling device 340 to simply add (or subtract) a MAC-ID (or broadcast ID) to a packet's checksum, an intended access terminal may determine whether the resultant packet is intended for it by simply performing a checksum operation, then comparing the resultant checksum to its MAC-ID, the broadcast ID, zero (indicating that no scrambling was performed) or perhaps some value indicating a subset of available access terminals. Similarly, an exclusive-or (XOR) operation of a checksum with a MAC-ID might be employed.

Assuming a checksum of 16 bits and a MAC-ID of 9 or 11 bits, it should be appreciated that the checksum may not only be uniquely changed for each MAC-ID, but that there may be ample state space to define dozens of different sub-groups of access points as well.

Still further, the scrambling device 340 may employ any number of operations useful for scrambling, including mapping operations, combinations of shifting, linear and logical operations, and so on.

After the scrambling device 340 has performed the appropriate data scrambling operations, the coding device 350 can perform the appropriate error correction coding operations.

Note that in various embodiments, the steps of coding and scrambling may be reversed in order.

However, it should be appreciated that if a packet is first encoded and then scrambled, the MAC 216 may need to perform a separate descrambling operation and a separate decoding operation for each MAC-ID (e.g., a broadcast MAC-ID and a unicast MAC-ID) that might be considered.

On the other hand, if a packet is first scrambled and then encoded, the MAC 216 can perform for a common decoding operation for any number of separate descrambling operations, which can substantially reduce processing overhead when multiple MAC-IDs must be considered.

Next, the scrambled and coded packet may be exported to the PHY level via output device 380, where the exported packet may then be wirelessly transmitted to any number of access terminals using any combination of transmission circuitry.

Figure 4:
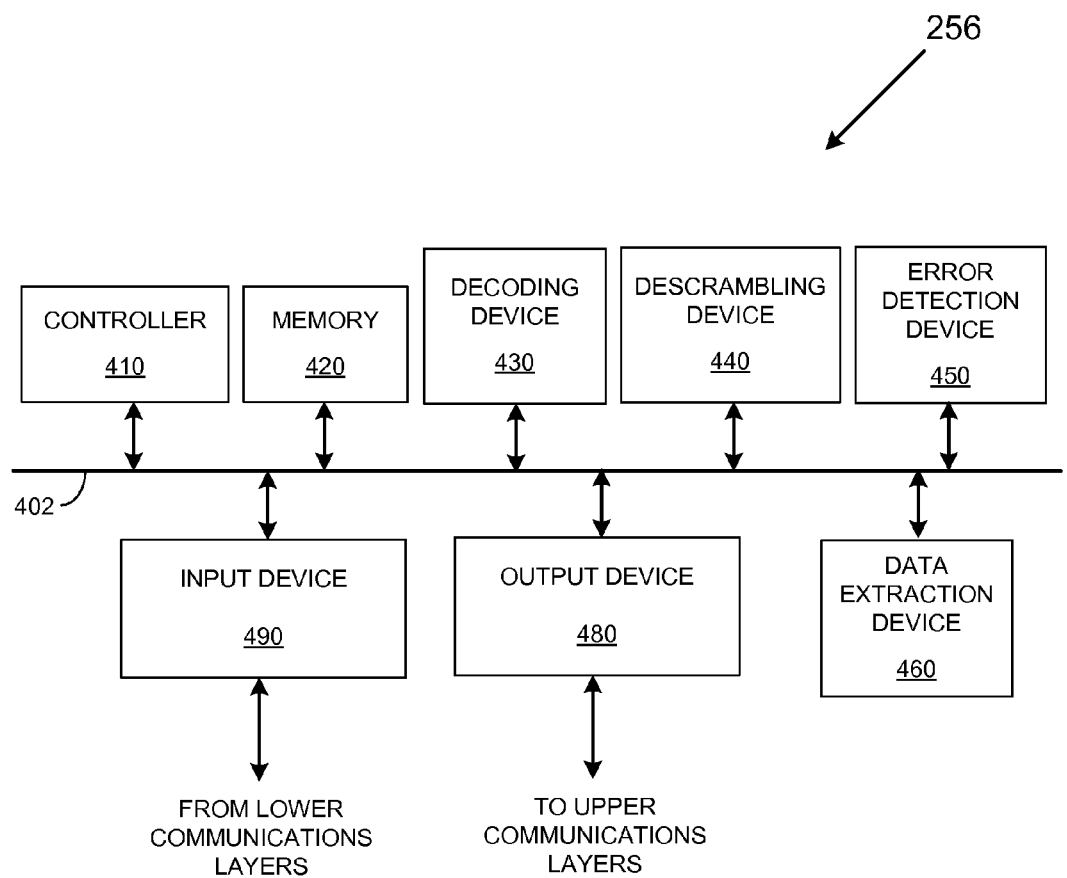
FIG. 4 shows details of a portion of an exemplary media access controller for the access terminal of FIG. 2.

FIG. 4 shows details of a portion of an exemplary media access controller 256 for the access terminal 120 of FIG. 2. As shown in FIG. 4, the exemplary media access controller 256 includes a controller 410, a memory 420, decoding device 430, a descrambling device 440, an error detection device 450, a data extraction device 460, an output device 480 and an input device 490. The above components 410-490 are coupled together by control/data bus 402.

As with the MAC 216 of FIG. 3, the present media access controller 256 of FIG. 4 uses a bussed architecture. However, it should be appreciated that any other architecture may be used as is well known to those of ordinary skill in the art. For example, in various embodiments, the various components 410-490 can take the form of separate electronic components coupled together via a series of separate busses. Still further, in various embodiments some of the above-listed components 430-460 can take the form of software/firmware routines residing in memory 420 to be operated upon by the controller 410, or even software/firmware routines residing in separate memories in separate servers/computers being operated upon by different controllers.

In operation, various forms of traffic information and packets of control information may be received by the input device 490 and stored in memory 420. For instances where a packet of control information is received from a remote access point, the controller 410 may cause the decoding device 430 to perform the appropriate error-decoding operations on the received packet. Subsequently, the decoded packet may be sent to the descrambling device 440.

The descrambling device 440 may then employ any number of descrambling operations upon the packet consistent with the form(s) of scrambling operations performed upon the packet by an access point. Assuming that the received packets of control data were scrambled based on a cipher key, descrambling may be based on the assumption that the cipher key is some form of information, such as a MAC-ID, related to the MAC 256 and/or a broadcast ID.

Again, it should be appreciated that various embodiments may employ scrambling and descrambling of less than an entirety of a packet's payload, and that scrambling may range from the entirety of a packet's payload to a single word of the payload. It should further be appreciated that, as with scrambling, descrambling operations may take the form of simple linear operations, e.g., adding/subtracting a MAC-ID or broadcast ID to a packet's checksum, logical operations, use of using shift-registers with feedback, mapping operations and so on.

After the descrambling device 440 has performed the appropriate data scrambling operations, the error detection device 450 may perform the appropriate check on the payload data to see whether the error detection data is commensurate with the rest of the payload section. Should the error detection device 450 determine that a packet is corrupted and/or isn't directed to the MAC 256, the controller 410 may cause the packet to be discarded and optionally send an appropriate flag to an external device signaling that the packet was discarded.

However, should the error detection device 450 determine that the packet is not corrupted and directed to the MAC 256, the controller 410 may cause the control information within the packet to be extracted using the data extraction device 460, and the extracted data to be exported for further processing via the output device 480 while optionally sending an appropriate flag to an external device signaling that a packet was accepted and ready for further processing.

Figure 6:
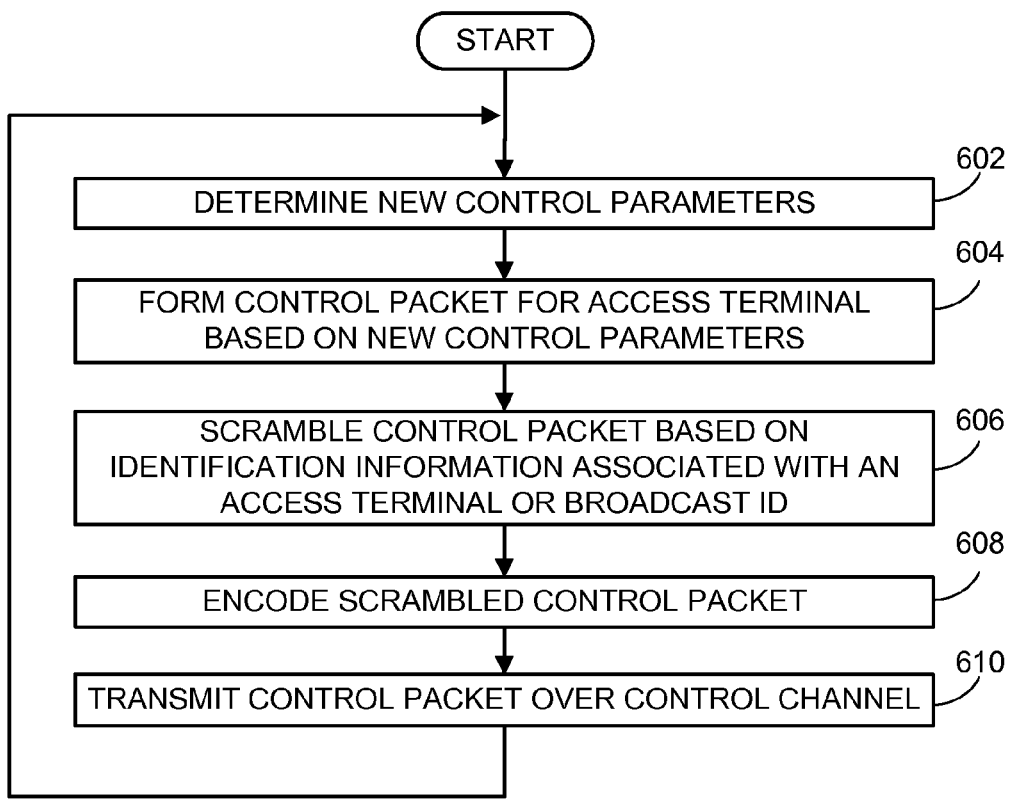
FIG. 6 is a flowchart outlining a first exemplary operation of the disclosed methods and systems.

FIG. 6 is a flowchart outlining a first exemplary operation of the disclosed methods and systems. The process starts in step 602 where a set of new control parameters/information may be determined by an access point or device associated with the access point. Next, in step 604, a control packet containing the control parameters/information is formed for one or more intended/targeted access terminal(s). Then, in step 606, a scrambling operation is performed on portions of the control packet (e.g., an entire payload section or a checksum) based on identification information (e.g., a MAC-ID) associated with the targeted access terminal, by a broadcast ID, or by some other identifier associated with one or more access terminals. Control continues to step 608.

In step 608, the scrambled control packet is then error-coded. Note that, as stated above, the steps of scrambling and coding may be interchanged in many embodiments. Next, in step 610, the coded and scrambled packet is then transmitted to one or more access terminals via a wireless control channel, and control then jumps back to step 602 where the process may be repeated as needed.

Figure 7:
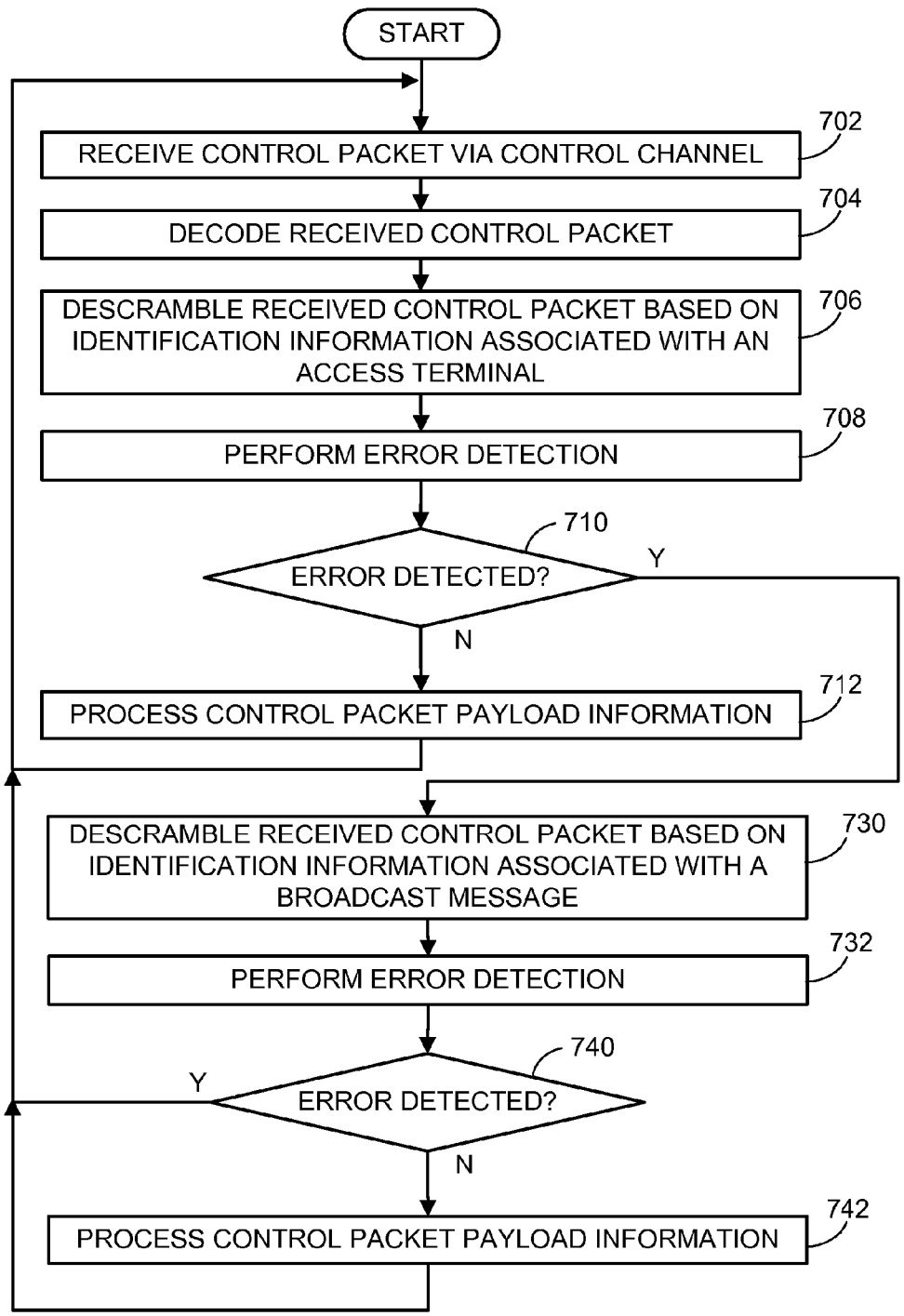
FIG. 7 is a flowchart outlining a second exemplary operation of the disclosed methods and systems.

FIG. 7 is a flowchart outlining a second exemplary operation of the disclosed methods and systems. The process starts in step 702 where a packet containing control information is received via a wireless control channel. Next, in step 704, the received packet is then error-decoded. Then, in step 706, the decoded packet is descrambled, again noting that the steps of scrambling and decoding may be interchanged in many embodiments. Additionally, as mentioned above, descrambling, like scrambling, may be based on MAC-IDs, broadcast IDs or other identifies. Further, descrambling operations, like scrambling operations, may take a variety of forms including shifting operations, mapping operations, linear operations, logical operations, and so on. Control continues to step 708.

In step 708, an error detection operation, such as a checksum verification, is performed. Then, in step 710, a determination is made as to whether a data error was found in step 708. If an error was detected, control jumps to step 730; otherwise, control continues to step 712.

In step 712, the information of the descrambled and decoded control packet may processed, e.g., the operational parameters of an access terminal may be modified based on the control information, and control then jumps back to step 702 where the process may be repeated as needed.

In step 730, the decoded packet is again descrambled, this time based on a broadcast ID and/or an ID associated with of a group/subgroup of access terminals. Next, in step 732, an error detection operation, such as a checksum verification, is performed. Then, in step 740, a determination is made as to whether a data error was found in step 732. If an error was detected, the received control packet may be effectively discarded and control jumps back to step 702; otherwise, control continues to step 742.

In step 742, the information of the descrambled and decoded control packet may processed, and control then jumps back to step 702 where the process may be repeated as needed.

In various embodiments where the above-described systems and/or methods are implemented using a programmable device, such as a computer-based system or programmable logic, it should be appreciated that the above-described systems and methods can be implemented using any of various known or later developed programming languages, such as "C", "C++", "FORTRAN", Pascal", "VHDL" and the like.

Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform the above-described systems and/or methods.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods related to communications.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for receiving information from an access point over a wireless link, comprising:
   receiving a packet comprising payload data and error detection data;
   processing the received packet using at least a descrambling operation on only the error detection data based on a first identifier associated with an access terminal to produce a processed packet, the error detection data having a 16-bit length, the first identifier having a 16-bit length matching the 16-bit length of the error detection data, and the descrambling operation being performed on only 16 bits of the error detection data based on 16 bits of the first identifier; and
   determining whether the received packet is targeted to the access terminal based on the processed packet.

2. The method of claim 1, wherein the step of processing further includes a decoding operation on the received packet.

3. The method of claim 1, wherein the step of processing includes first decoding the received packet to produce a decoded packet, then descrambling the error detection data from the decoded packet.

4. The method of claim 3, wherein the step of processing further includes determining whether the received packet is decoded correctly or in error based on descrambled error detection data.

5. The method of claim 1, wherein the step of determining includes determining whether the received packet is targeted to the access terminal based on descrambled error detection data.

6. The method of claim 1, wherein the error detection data includes a checksum derived from the payload data.

7. The method of claim 6, wherein the first identifier comprises a media access controller (MAC) identifier (MAC-ID) of the access terminal.

8. The method of claim 7, wherein the MAC-ID of the access terminal comprises a MAC-ID assigned to the access terminal.

9. The method of claim 7, wherein the checksum is descrambled by adding or subtracting the MAC-ID to or from the checksum.

10. The method of claim 7, wherein the checksum is descrambled by performing a logical operation on the checksum based on the MAC-ID.

11. The method of claim 7, wherein the checksum is descrambled by performing a shift-register based operation based on the MAC-ID.

12. The method of claim 6, wherein the first identifier comprises a broadcast media access controller identifier (MAC-ID).

13. The method of claim 6, wherein the step of processing causes only the checksum to be descrambled.

14. The method of claim 1, further comprising:
determining resources allocated to the access terminal based on the received packet if the received packet is targeted to the access terminal.

15. The method of claim 1, wherein the error detection data is descrambled by adding or subtracting the first identifier to or from the error detection data.

16. The method of claim 1, wherein the error detection data is descrambled by performing a shift-register based operation.

17. The method of claim 1, wherein the error detection data is descrambled by performing a linear operation.

18. The method of claim 1, wherein the step of processing includes:
performing a first descrambling operation based on a media access controller identifier (MAC-ID) specifically associated with the access terminal to produce a first processed packet; and
performing a second descrambling operation based on a broadcast MAC-ID to produce a second processed packet.

19. The method of claim 18, wherein the step of determining includes determining whether the received packet is targeted to the access terminal based on both the MAC-ID specific to the access terminal and the broadcast MAC-ID.

20. The method of claim 1, wherein the pay load data comprises control information.

21. An integrated circuit that performs the method of claim 1.

22. A Media Access Controller (MAC) that performs the method of claim 1.

23. A computer-readable memory containing a plurality of instructions that, when accessed by a computer, enables the computer to perform the steps of:
receiving a packet comprising payload data and error detection data;
processing the received packet using at least a descrambling operation on only the error detection data based on a first identifier associated with an access terminal to produce a processed packet, the error detection data having a 16-bit length, the first identifier having a 16-bit length matching the 16-bit length of the error detection data, and the descrambling operation being performed on only 16 bits of the error detection data based on 16 bits of the first identifier; and
determining whether the received packet is targeted to the access terminal based on the processed packet.

24. The computer-readable memory of claim 23, wherein the processing instructions further include a decoding operation on the received packet.

25. The computer-readable memory of claim 23, wherein the processing instructions include a decoding operation on the received packet to produce a decoded packet, then a descrambling operation on the error detection data from the decoded packet.

26. The computer-readable memory of claim 23, wherein the determining instructions include determining whether the decoded packet is targeted to the access terminal based on descrambled error detection data.

27. The computer-readable memory of claim 23, wherein the first identifier comprises a media access controller (MAC) identifier (MAC-ID) assigned specifically to the access terminal or a broadcast MAC-ID.

28. The computer-readable memory of claim 23, wherein the error detection data is descrambled by performing at least one of a linear operation, an addition operation, a subtraction operation, a shift-register based operation, or a mapping operation.

29. The computer-readable memory of claim 23, wherein the payload data comprises control information.

30. An apparatus for receiving information from an access point over a wireless link, comprising:
a media access controller (MAC) with a processing circuit and a memory in communication with the processing circuit, wherein the MAC is configured to receive a packet comprising payload data and error detection data, and to process the received packet by performing a descrambling operation on only the error detection data based on a MAC identification (MAC-ID), the error detection data having a 16-bit length, the MAC-ID having a 16-bit length matching the 16-bit length of the error detection data, and the descrambling operation being performed on only 16 bits of the error detection data based on 16 bits of the MAC-ID.

31. The apparatus of claim 30, wherein the MAC is further configured to perform a decoding operation on the received packet to produce a decoded packet, then a descrambling operation on the error detection data from the decoded packet.

32. The apparatus of claim 30, wherein the MAC is further configured to perform descrambling based on at least one of a linear operation, an addition operation, a subtraction operation, a shift-register based operation, or a mapping operation.

33. The apparatus of claim 30, wherein the error detection data includes a checksum derived from the payload data.

34. The apparatus of claim 30, wherein the payload data Comprises control information.

35. An apparatus for receiving information from an access point over a wireless link, comprising:
a computer-readable memory for storing a packet comprising payload data and error detection data; and
a determining means in communication with the memory for determining whether the packet residing in the memory is intended for the apparatus based on a descrambling operation on only the error detection data in the packet using a Media Access Controller Identifier (MAC-ID), the error detection data having a 16-bit length, the MAC-ID having a 16-bit length matching the 16-bit length of the error detection data, and the descrambling operation being performed on only 16 bits of the error detection data based on 16 bits of the MAC-ID.

36. The apparatus of claim 35, wherein the determining means includes a decoding means for performing a decoding operation on the received packet to produce a decoded packet, and a descrambling means for performing the descrambling operation on the error detection data from the decoded packet.

37. The apparatus of claim 36, wherein the determining means includes a means for determining whether the packet is decoded correctly or in error based on descrambled error detection data.

38. The apparatus of claim 35, wherein the error detection data includes a checksum derived from the payload data.

39. The apparatus of claim 35, wherein the payload data comprises control information.

40. A method for transmitting information to an access terminal over a wireless link, comprising:

obtaining a packet comprising payload data and error detection data;

processing the packet by applying at least a scrambling operation on only the error detection data based on a first identifier associated with an intended access terminal to produce a processed packet, the error detection data having a 16-bit length, the first identifier having a 16-bit length matching the 16-bit length of the error detection data, and the scrambling operation being performed on only 16 bits of the error detection data based on 16 bits of the first identifier; and transmitting the processed packet to the intended access terminal.

41. The method of claim 40, wherein the step of processing further includes a coding operation after the scrambling operation.

42. The method of claim 40, wherein the error detection data comprises a checksum derived from the payload data.

43. The method of claim 40, wherein the first identifier comprises a media access controller identifier (MAC-ID) of the intended access terminal.

44. The method of claim 40, wherein the first identifier comprises a broadcast media access controller identifier (MAC-ID).

45. The method of claim 40, wherein the payload data comprises control information.

46. The method of claim 40, wherein the error detection data is scrambled based on at least one of a linear operation, an addition operation, a subtraction operation, a shift-register based operation, or a mapping operation.

47. The method of claim 40, wherein the error detection data is scrambled by adding or subtracting the first identifier to or from the error detection data.

48. An apparatus for transmitting information to an access terminal over a wireless link, comprising:

a media access control (MAC) circuit configured to obtain a packet comprising payload data and error detection data and to scramble only the error detection data based on a Media Access Controller Identifier (MAC-ID), the error detection data having a 16-bit length, the MAC-ID having a 16-bit length matching the 16-bit length of the error detection data, and the scrambling operation being performed on only 16 bits of the error detection data based on 16 bits of the MAC-ID; and transmission circuitry for transmitting the scrambled packet.

49. The apparatus of claim 48, wherein the media access control (MAC) circuit is configured to perform a coding operation on the packet after the scrambling operation.

50. The apparatus of claim 48, wherein the payload data comprises control information.

51. The apparatus of claim 48, wherein the error detection data comprises a checksum derived from the payload data.

52. The apparatus of claim 48, wherein the MAC-ID is a unicast MAC-ID for an access terminal or a broadcast MAC-ID.

53. The apparatus of claim 48, wherein the MAC circuit is configured to scramble the error detection data based on at least one of a linear operation, an addition operation, a subtraction operation, a shift-register based operation, or a mapping operation.

54. The apparatus of claim 48, wherein the media access control (MAC) circuit is configured to scramble the error detection data by adding or subtracting the MAC-ID to or from the error detection data.

\* \* \* \* \*